Figure 1:
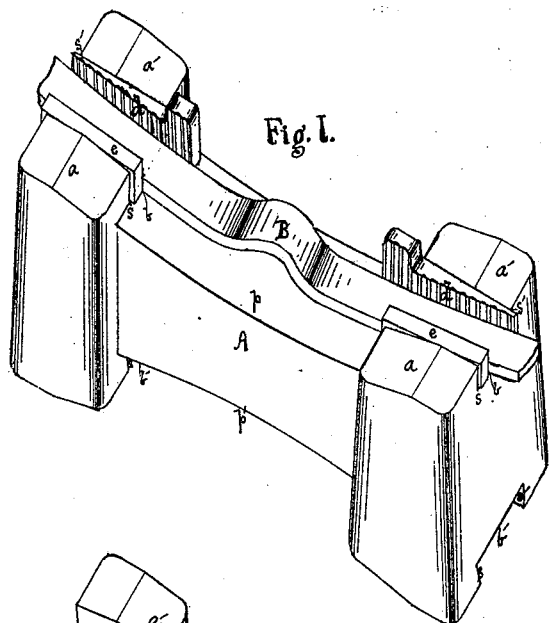

*W. Bowden,*

*Tire Upsetter.*

*N⁰. 106,775.*      *Patented Aug. 30. 1870.*

Witnesses.
S. R. Drake
C. N. Woodward

Inventor,
William Bowden
by
J. Fraser & Co., atty's
Buffalo. N.Y.

United States Patent Office.

WILLIAM BOWDEN, OF HAMBURG, NEW YORK, ASSIGNOR TO HIMSELF AND ABBOTT C. CALKINS OF SAME PLACE.

Letters Patent No. 106,775, dated August 30, 1870.

---

IMPROVED MACHINE FOR UPSETTING TIRES.

---

The Schedule referred to in these Letters Patent and making part of the same.

---

To all whom it may concern:

Be it known that I, WILLIAM BOWDEN, of the town of Hamburg, county of Erie and State of New York, have invented a certain new and useful Improvement in "Devices for Upsetting Tires," of which the following is a specification.

Nature of Invention.

This invention relates to an improvement in machines for upsetting tires.

General Description.

In the drawing—

Figure 1 is a perspective view with the tire in place, and

Figure 2:
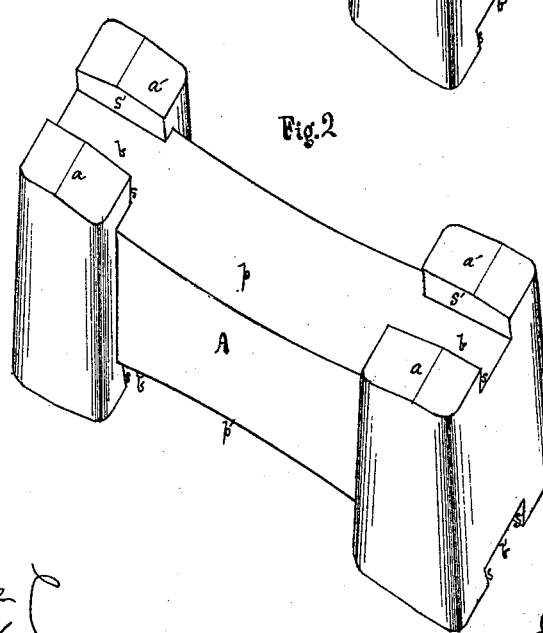

Figure 2, a similar view with the tire removed.

A is a cast-iron block, formed with concaves $p\ p$ on the reverse faces, and having posts or studs $a\ a'\ a\ a'$ at the corners, which serve the double purpose of legs, on which the block stands, and as fastenings for the wedges and keys, as hereinafter described.

The inner faces $s$ of the studs $a\ a$ are made straight, and receive plain keys $e\ e$, against which the edge of the tire rests when the tire is a very narrow one.

The faces $s'\ s'$ of the opposite studs $a'\ a'$ are made wedge-shaped longitudinally, and slightly dovetailed horizontally, and a serrated wedge, $d$, is driven in between it and the edge of the tire, so that every blow struck on the tire forces this wedge in tighter, and inflexibly holds the tire until hammered down to compress the metal. This construction is the same on both sides, and therefore it can be reversed, and both sides used, one for light and the other for heavy tires, the spaces $b'$ on the other side being merely made wider.

The concave shape of the block conforms to the circle of the tire.

Operation.

The tire is heated at its thinnest or weakest part, and "drawn up," as shown at B. It is then placed upright on the block A, the small key $e$ put in the space on one side, if the tire is narrow, and the serrated wedge $d$ on the other, and driven in. Then the tire is hammered out flat, to compress the metal, the whole operation taking but a few minutes.

The novelty in my invention consists simply in the construction of the block, with the reverse concaves $p\ p$ and the posts $a\ a'$, which leave the wedge-shaped and dovetailed spaces between for the insertion of the keys and wedges.

I am aware that keys and wedges have before been used, also blocks of various forms; but no block, so far as I am aware, of the form I have above described.

It is exceedingly cheap and simple, and can be made by any workman.

What I claim is—

The improved apparatus herein described, consisting of the block A, having the reverse concaves $p\ p'$ and the studs $a\ a'$, forming wedge-shaped and dovetailed spaces $s\ s'$, for the insertion of the keys $e$, and serrated wedges $d$, the whole arranged as described and operating in the manner and for the purpose specified.

In witness whereof I have hereunto signed my name in the presence of two subscribing witnesses.

WILLIAM BOWDEN.

Witnesses:
J. R. DRAKE,
LYMAN P. PERKINS.